J. TEPPERT.
BOW SHORTENING DEVICE FOR VEHICLE TOPS.
APPLICATION FILED JUNE 7, 1911.
1,112,171.
Patented Sept. 29, 1914.
3 SHEETS—SHEET 2.
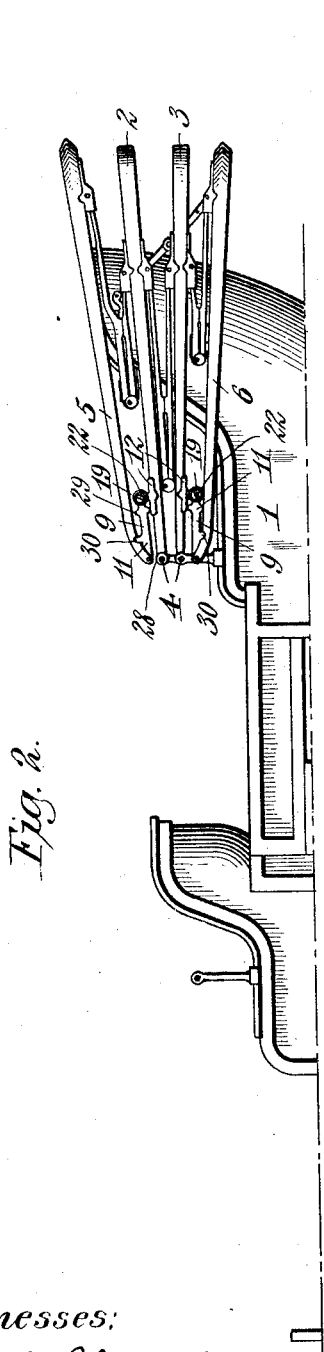
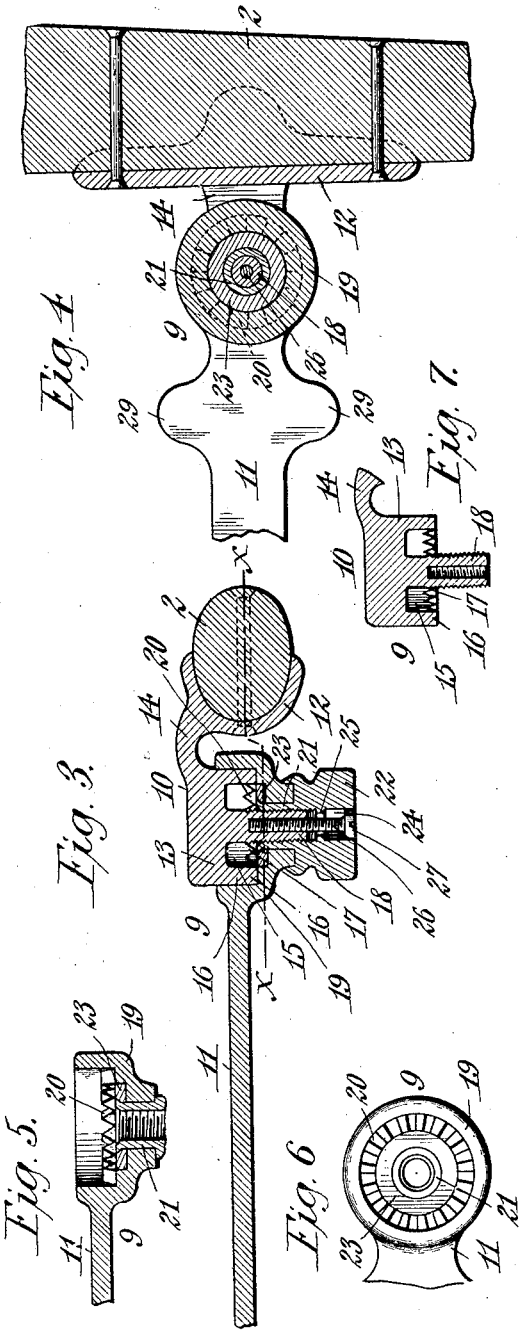
Witnesses:
Jacob Oberst, Jr.,
Ella C. Ruckhahn.
Joseph Teppert, Inventor.
By Emil Neuhart
Attorney.

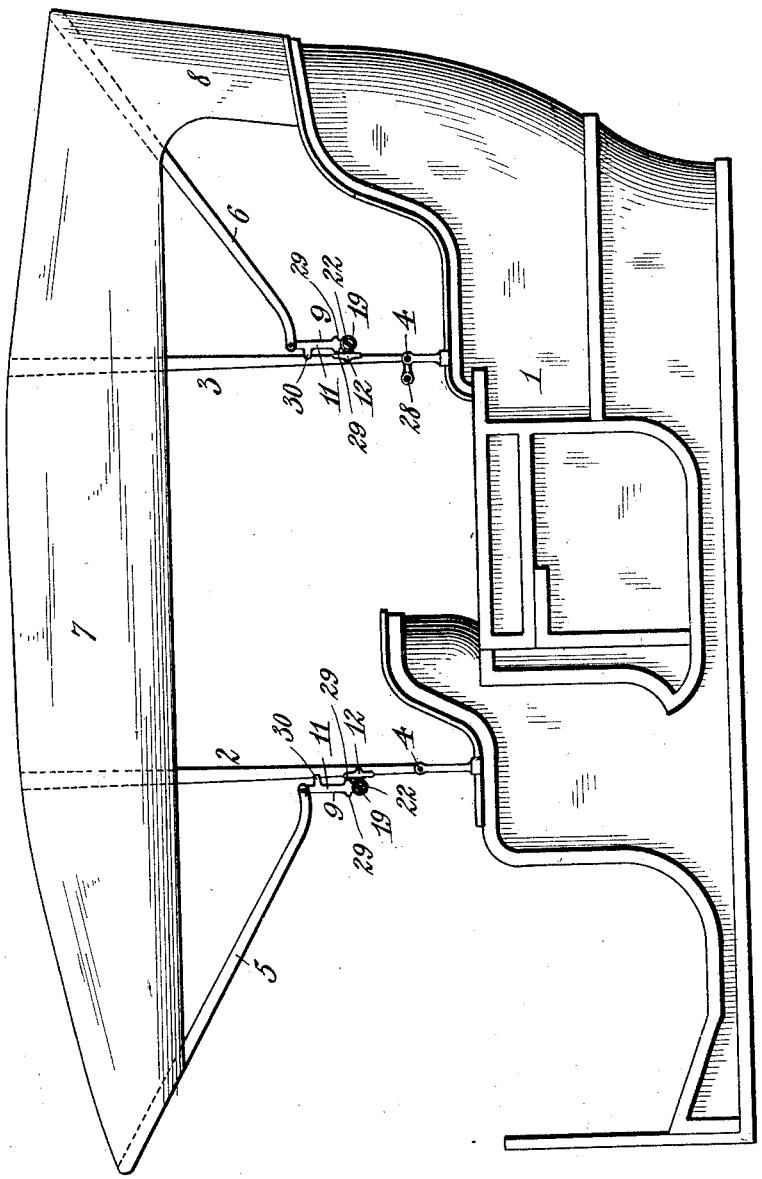

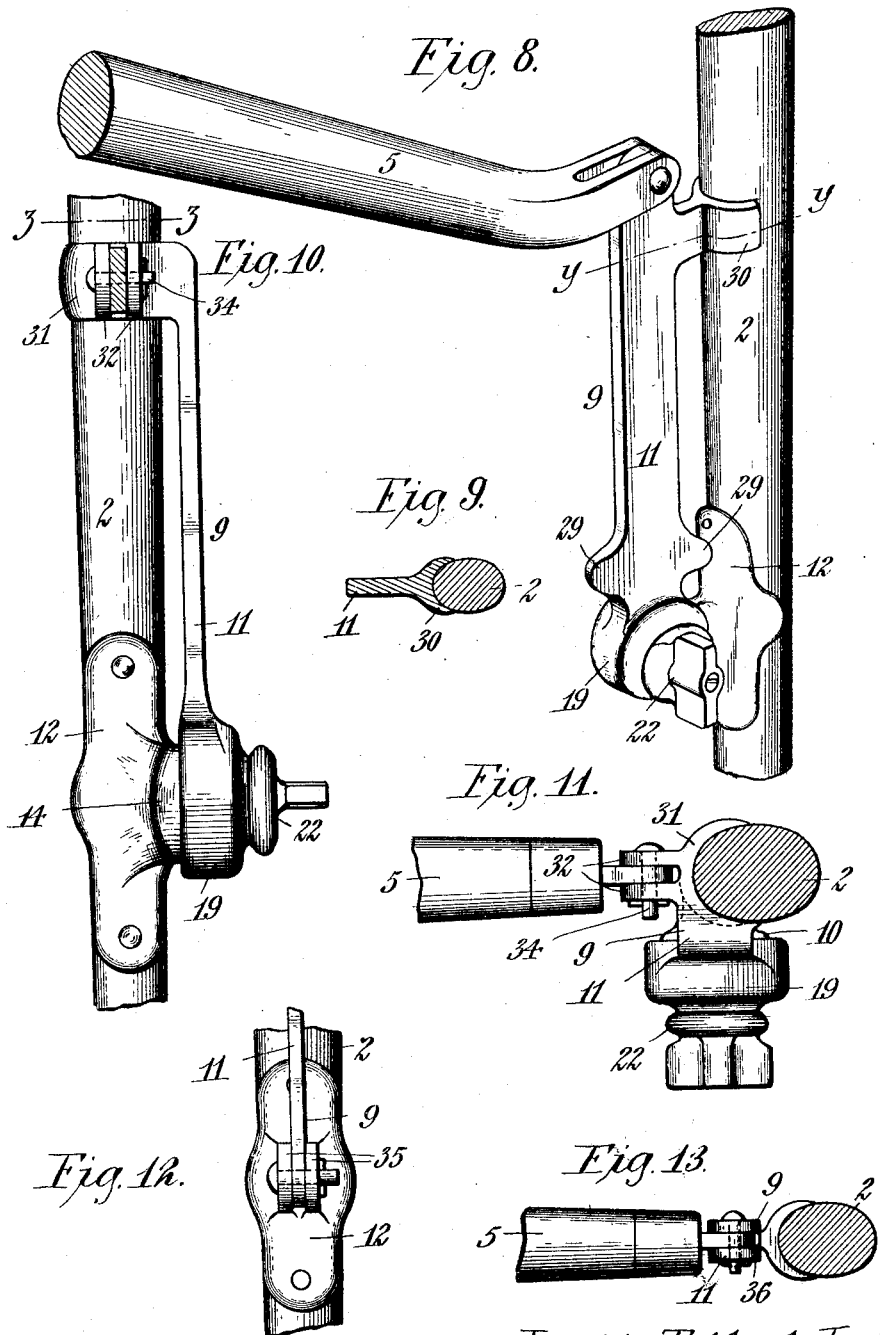

UNITED STATES PATENT OFFICE.

JOSEPH TEPPERT, OF BUFFALO, NEW YORK.

BOW-SHORTENING DEVICE FOR VEHICLE-TOPS.

1,112,171.  Specification of Letters Patent.  Patented Sept. 29, 1914.

Application filed June 7, 1911. Serial No. 631,722.

*To all whom it may concern:*

Be it known that I, JOSEPH TEPPERT, a subject of the Emperor of Germany, residing at Buffalo, in the county of Erie and State of New York, have invented new and useful Improvements in Bow - Shortening Devices for Vehicle - Tops, of which the following is a specification.

This invention relates to bow shortening devices for vehicle tops, and it has for its primary object the provision of means for shortening the diagonal or brace bows of a vehicle top when folding the same so that the upper or outer ends of the diagonal or brace bows are in line or approximately so with the main or vertical bows when the top is folded.

Another object of my invention is the provision of means for such purposes which can be easily applied to vehicle tops now in use and which when applied to new tops may be modified, without departing from the spirit of my invention, to meet the requirements for the purpose intended.

Another object of my invention is the provision of a bow shortening device which may be easily locked against movement when the top is raised or opened.

With these and other objects in view the invention consists in means for shortening the diagonal or brace bows of vehicle tops when folded; in the means for retaining the diagonal or brace bows in the desired position when the top is raised or opened; and in the construction, arrangement and combination of parts to be hereinafter described and particularly pointed out in the subjoined claims.

In vehicle tops, the diagonal bows are invariably longer than the main or vertical bows, and therefore when the top is folded, it extends a considerable distance in rear of the vehicle body, the diagonal bows extending farther rearward than the main or vertical bows, and therefore resulting in an irregular shaped and unsightly top when closed.

In the drawings,—Figure 1 is a side elevation of an automobile body provided with a top embodying my invention, the top being raised. Fig. 2 is a similar view showing the top folded and showing only the upper portion of the vehicle body; the covering of the top being omitted. Fig. 3 is an enlarged section taken through the pivotal point of the bow shortening device. Fig. 4 is a cross section taken on line $x-x$, Fig. 3. Figs. 5 to 7 are detail views of the shortening device. Fig. 8 is an enlarged perspective view of the bow shortening device attached to one of the vertical bows of the top. Fig. 9 is a transverse section taken on line $y-y$, Fig. 8. Fig. 10 is a front elevation of a bow shortening device in slightly different form. Fig. 11 is a section taken on line $z-z$, Fig. 10. Fig. 12 is a front elevation of a bow shortening device of another form, and Fig. 13 is a top plan view of the same.

Referring now to the drawings in detail, like numerals of reference refer to like parts in the several figures.

In Figs. 1 to 9, inclusive, I have illustrated a bow shortening device adapted for use in connection with a vehicle top constructed according to my Patent No. 968,894, dated August 30, 1910, wherein the brace connecting the bows of the top are arranged between the top covering and lining and are adapted to fold inward or toward the pivotal points of the bows. In such construction, the bows when folded are held separated to a greater extent than in vehicle tops of ordinary construction and therefore spaces of sufficient size will be formed between adjacent bows for the accommodation of the shortening device.

The construction illustrated in Figs. 10 and 11, is particularly adapted for vehicle tops in which the bows are brought quite close together, as in the tops now generally used, and for this reason, the pivot head and arms are arranged out of line with the bows.

The construction illustrated in Figs. 12 and 13, may be employed either on my improved vehicle top referred to, or on the tops generally used, as the same may be arranged to lie either in the plane of the bows, as shown in Figs. 1 to 9, or in a plane outside of the said bows when folded, as illustrated in Figs. 10 and 11.

The reference numeral 1 designates a vehicle body, 2 and 3 the vertically-disposed bows pivotally secured to the vehicle body, as at 4, and 5, 6 are the diagonal or brace bows extending forward and rearward, respectively, from the bows 2, 3.

7 designates the top covering which is of leather or any other suitable flexible material and is attached to the bows 2, 3, 5 and 6. From the rear end of the top covering a back-stay 8 extends and has connection at the rear end of the vehicle body.

9 designates the bow shortening devices, one being applied to each vertically-disposed bow. Each shortening device comprises a head 10 and an arm or lever 11 pivoted to the head and having pivotal connection at its outer end with the inner end of its co-operating diagonal or brace bow. Each head of the shortening device comprises preferably a concaved securing member 12 riveted or otherwise fastened to one of the vertically-disposed bows and a cylindrical retaining member 13 connected to said securing member by an arm or web 14. Each retaining member has an outwardly-facing annular groove 15 which forms an annular rim 16 whose outer edge is provided with teeth 17 for a purpose to appear hereinafter. Extending outwardly and axially from said retaining-member is an externally and internally threaded stud 18, the external threads of which are arranged opposite to the internal threads thereof.

The inner end of each arm or lever 11 has a circular enlargement 19 in which is formed a circular depression of a size to receive the cylindrical retaining member 13 and having formed therein a circular series of teeth 20 for co-action with the teeth of said retaining-member. Said enlargement is also provided with an axial bore through which is passed a sleeve 21 formed on a thumb nut 22, said sleeve being spread at its inner end against the inner beveled wall of a washer 23 seated in a circular depression formed around the axial bore of the enlargement 19, thus preventing the withdrawal of the thumb nut from said enlargement. The thumb-nut has an axial bore 24 in which is formed an annular flange 25 and extending inward from said flange the bore is threaded to receive the threaded stud 18 while the portion of the bore extending outward from said flange is left smooth. The threads whereby the stud 18 is connected to the thumb nut is preferably a right-hand thread, while the internal thread of said stud is a left-hand thread into which is screwed a stop screw 26 having its head 27 serving as a stop adapted to strike against the flange 25 so as to prevent separation of the main parts of the shortening device. It is of course understood that after removing the stop screw 26, the arm or lever 11 with its enlargement or head and the thumb nut carried thereby can be removed from the retaining member 13. It is clear therefore, from the description of this shortening device that it comprises two main parts; one a fixed part secured to one of the vertically-disposed bows and the other a movable part connecting the fixed part with the inner end of a diagonal or brace bow. Normally, which is the position shown in Fig. 1, the arms or levers 11 extend upwardly from their pivotal points, but when preparing to fold the top the thumb nut 22 is turned within the enlargement of each lever, thus causing the lever to be moved outward so that the teeth on the same become disengaged from the teeth of the retaining member, after which the arm can be swung down into the position shown in Fig. 2 and upon folding the top, the upper or outer ends of the diagonal or brace bows will be brought approximately in line with the upper or outer ends of the vertical bows, thus considerably shortening the top when folded and making a much neater appearance. It is of course understood, that before the top is folded over the rear seat, the front vertically-disposed bow must be connected with the eye 28 forming part of the rear vertical bow or part of the bracket to which said rear vertical bow is secured, as may be desired.

I preferably provide each of the levers or arms 11 of the shortening device with opposite extensions 29 adjacent the pivotal point, one of which is adapted to bear against the securing member 12 when the arm is swung upward, and the other of which is adapted to bear against said member when the arm is swung downward, thus preventing marring or otherwise injuring the leather faced bows; and in order to guide against lateral deflection of said bows when carrying the weight of their respective top portions, each arm has a U-shaped extension 30 at one of its edges adapted to embrace the adjacent vertically-disposed bow when the top is raised, said extensions being preferably arranged near the outer ends of said arms or levers. The pivotal points of the vertically-disposed bows and also the pivotal points of the shortening devices to said bows are preferably in horizontal alinement and it is to be noted that where sufficient space is provided between co-acting bows, the shortening-devices have their arms or levers in line with said bows so that when the top is folded, the U-shaped extensions of said arms or levers embrace the diagonal or brace bows near their pivoted ends, as clearly shown in Fig. 2.

Where the braces connecting the bows are swung upward or outward when folding the top and also in tops having the braces omitted, the bows come comparatively close together when folded and therefore do not leave sufficient space between them for accommodation of the shortening device. In such case the retaining member 13 is off-set on the securing member 12 so as to bring said retaining member out of alinement with the bows and as the enlargement 19 of the arm or lever 11 surrounds the retaining member, said arm or lever is also arranged out of alinement. The outer end of the arm or lever has also a lateral extension 31 in the form of a U-shaped embracing member adapted to embrace the vertical bow when the top is raised and the co-acting diagonal or brace bow when the top is lowered; and in order to retain the alinement of the co-acting bows, each lateral extension has a pair of spaced ears 32, between which the inner end of the co-acting diagonal or brace bow is placed, a rivet 34 serving to connect said diagonal or brace bow with said lateral extension. The main portion of the shortening device therefore lies in a plane outside of the bows and does not in any manner interfere with the folding of the top. The construction of the parts may be otherwise the same as illustrated in Figs. 1 to 9.

In the construction shown in Figs. 12 and 13, I dispense with the locking mechanism at the point of pivotal connection between the two main parts of the shortening device, and in such cases the securing member 12 is provided with a pair of spaced ears 35 between which the inner end of the arm or lever 11 is pivotally secured. The outer end of the arm or lever 11 may be bifurcated, as at 36, to receive the inner end of the brace bow co-acting therewith. In said figures, the arm or lever is shown in line with the bows, but where the space between the bows is not sufficient to accommodate the device, the arm or lever may be off-set, as shown in Figs. 10 and 11.

The lever or arm 11 of the shortening device and its adjuncts, may be said to form a portion of a diagonal bow, and when so considered, each side of the bow is necessarily constructed of two sections, one of which is the arm or lever 11.

It is apparent from the foregoing that the construction and manner of connection can be changed in many ways without departing from the spirit of my invention or sacrificing any of the advantages thereof.

Having thus described my invention, what I claim is,—

1. In a vehicle top having a vertically-disposed bow and a diagonal or brace bow, a shortening device connecting said bows comprising a head secured to said vertically-disposed bow, and a lever secured to said diagonal or brace bow, said head having an axial externally-threaded stud and a rim surrounding said stud and having a series of teeth at its edge, said lever having a circular depression into which said head is fitted and having a series of teeth co-acting with the teeth on the rim of said head, and a thumb nut passing through said lever and provided with internal threads engaging said axial stud.

2. In a vehicle top having a vertically-disposed bow and a diagonal or brace bow, a shortening device comprising a head fixedly secured to said vertically-disposed bow and provided with an externally-threaded stud extending axially therefrom and an annular rim surounding said stud and having a series of teeth at its edge, a lever pivotally connected at its outer end to said diagonal or brace bow and having at its inner end a circular depression to receive the rim of said head and a series of teeth engaging the teeth of said rim, a thumb nut rotatably held in said lever and having an internally-threaded bore into which said stud is threaded, and means to prevent accidental disengagement of said lever from said head.

3. In a vehicle top having a vertically-disposed bow and a diagonal or brace bow, a shortening device interposed between the two comprising a head fixedly secured to said vertically-disposed bow and having an externally-threaded axial stud and a circular rim surrounding said stud and provided with a series of teeth at its edge, and a lever having a circular depression to receive said circular rim and a circular series of teeth engaging the teeth of said rim, said lever having an axial bore provided with an enlargement at its inner end, a washer fitting into said enlargement, and a thumb nut passing through the bore of said lever, and expanded at its inner end onto said washer, said thumb nut being threaded onto said axial stud.

4. In a vehicle top comprising a vertically-disposed bow and a diagonal or brace bow, a shortening device connecting said bows and comprising a head fixedly secured to said vertically-disposed bow and having an axial externally-threaded stud provided with a central bore internally-threaded in an opposite direction, a lever pivotally connected at its outer end with said diagonal or brace bow and having a central depression to receive said head, an axial bore, a thumb nut rotatably retained in the bore of said lever and having internal screw-threads engaging the external threads of said stud and an internal flange between said screw threads and the outer end of said nut, a stop screw threaded into the threaded bore of said stud and having a head adapted to engage said flange and prevent removal of said lever from said head, and means whereby said lever may be retained by said thumb nut in either of a plurality of positions.

In testimony whereof, I have affixed my signature in the presence of two subscribing witnesses.

JOSEPH TEPPERT.

Witnesses:
ELLA C. PLUECKHAHN,
EMIL NEUHART.